Patented Dec. 9, 1947

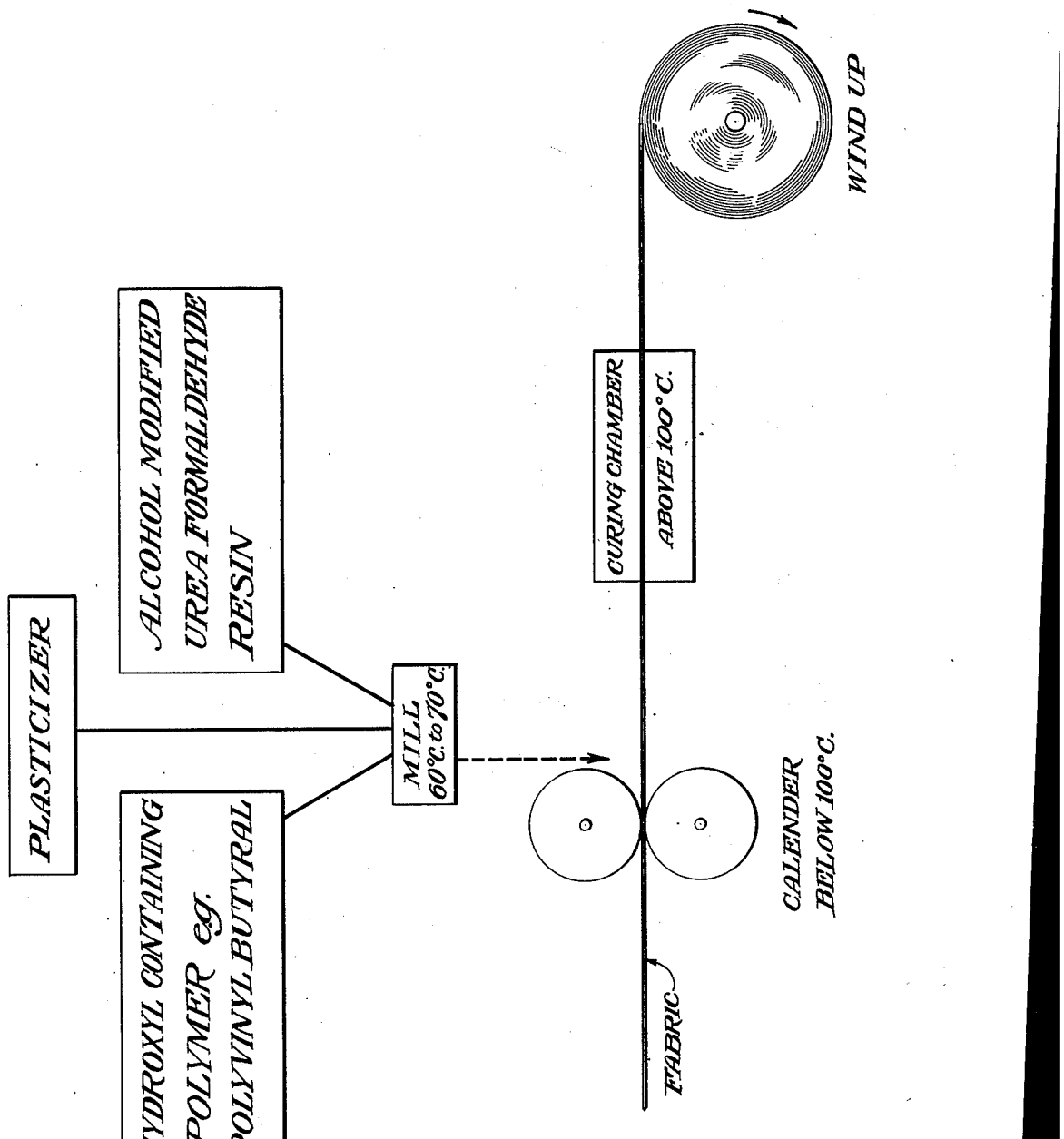

2,432,242

UNITED STATES PATENT OFFICE 2,432,242

CALENDERED SHEET COMPRISING THE REACTION PRODUCT OF A POLYVINYL ACETAL AND AN ALCOHOL-MODIFIED UREA-FORMALDEHYDE RESIN AND METHOD OF MAKING SAME

Robert M. Leekley, Wilmington, Del., assignor to E. I. du Pont de Nemours & Company, Wilmington, Del., a corporation of Delaware Application February 20, 1943, Serial No. 476,620

12 Claims. (Cl. 18—55)

1

This invention relates to new heat curable plastic compositions and in particular to the preparation of non-thermoplastic sheet material by calendering and curing these plastic compositions.

Synthetic plastics to be useful as coating compositions or for the formation of shaped articles must be soluble or sufficiently thermoplastic to permit application or fabrication. However, it is generally undesirable for the polymeric material which serves as the plastic to remain permanently soluble or thermoplastic after fabrication because it cannot then be used in articles which are exposed to high temperatures or which come in contact with liquids which are solvents for the polymeric material. In the manufacture of unsupported sheeting or coated fabrics by calendering, it is essential that the polymeric material become plastic and workable at some elevated temperature. However, if the material remains permanently thermoplastic it will again become soft, plastic, and subject to damage whenever it is heated to a temperature as high or higher than the original calendering temperature. Furthermore, if the polymeric material is soluble, as most thermoplastic resins are, it is not suitable for use where it will come in contact with solvents. For these reasons it is highly desirable to use heat curable resins which are initially sufficiently thermoplastic to permit calendering but which become insoluble and non-thermoplastic when the final article is baked at an appropriate elevated temperature.

The number of polymeric materials which can be cured is, unfortunately, extremely limited. In the field of molded articles the thermosetting urea-formaldehyde and phenol-formaldehyde resins, which are initially sufficiently plastic to permit molding, but become insoluble and non-thermoplastic during molding, are greatly preferred over non-thermosetting resins for the preparation of articles which must withstand high temperatures or contact with solvents. However, these resins cannot be pliablized sufficiently with plasticizers to make them suitable for flexible articles. Even as molding compositions their brittleness, opacity, and, in some cases, their color are serious disadvantages. Rubber and synthetic rubbers have been the principal materials used where flexible articles or coatings capable of being cured by heat have been required. The great advantage of rubber for many uses is that it can be compounded with the materials required for vulcanization and subsequently milled, calendered, or extruded without premature curing of the composition during these operations. The rubber article or coating can then be cured with heat to render it insoluble and non-thermoplastic. In many respects, however, rubber is inferior to thermoplastic resins. It has poor age resistance, especially at high temperatures, in the presence of ozone or when exposed to sunlight. Pigmented rubber compositions show poor resistance to crocking which is the tendency for the pigment to be rubbed off the surface. Furthermore, rubber is badly swollen by oils, greases and hydrocarbon solvents. Its color makes it unsuitable for use in transparent or light but bright colored objects.

In many respects thermoplastic polymeric materials such as cellulose esters, cellulose ethers, and acetals of polyvinyl alcohol are superior to any of the known thermo-setting resins. They are easily plasticized to yield compositions varying widely in pliability. Their clarity and absence of color permits their use in articles which are transparent or opaque and which are either colorless or colored. Furthermore, these thermoplastic materials are superior to rubber in their resistance to aging and crocking and are not affected by oils, greases or hydrocarbon solvents. Methods have been proposed for curing synthetic polymeric materials which contain functional groups such as hydroxyl, amino, carboxyl and amide groups. This is accomplished by reacting the polymeric material with an agent which is capable of reacting with two or more of the reactive groups present in the polymer. For example, di-isocyanates such as hexamethylene di-isocyanate, have been used for curing polymeric materials containing hydroxyl groups. Due to the extreme reactivity of the isocyanate, curing occurs at room temperature and very rapidly at slightly elevated temperatures. Polymerized dimethylolurea is known to insolubilize polyvinyl alcohol at temperatures as low as 50° C. Other agents which have been proposed for insolubilizing or reducing the thermoplasticity of polymeric materials containing hydroxyl groups are dimethylolurea, formaldehyde, dichlorodioxane and acid chlorides or anhydrides of dibasic acids. Although the use of these agents has increased somewhat the usefulness of these polymeric materials, all cause insolubility and reduction of thermoplasticity at such low temperatures as to be unsuitable for many uses. In the calender coating of fabric, for example, the polymeric material is compounded by milling with plasticizers, pigments and other ingredients and is then applied to a fabric by means of calendering rolls. To accomplish this the polymeric material must be maintained at a temperature at which it is plastic or calenderable. Compositions which cure at low temperatures are not suitable for use since a satisfactory coating cannot be obtained if curing occurs during compounding or calendering. When calender coated fabric or unsupported calendered sheeting is produced on a large scale, it is desirable to use a composition which does not cure even when heated at a temperature somewhat higher than the normal calendering temperature for a longer period than is normally required for calendering. Although the calendering operation is rapid, and the larger portion of the composition may be heated for only a short time, small amounts of material may roll for a considerable time in the nip of the calender rolls. If this small amount of composition begins to cure before passing through the mill, it produces a rough spot or hole in the product. During operation the temperature of the mills may be inadvertently raised several degrees above the normal operating temperature and the composition should not cure under these conditions. Furthermore, whenever operation must be interrupted, part of the composition is unavoidably heated for a longer time. Compositions which calender satisfactorily during normal operation often cure prematurely under these conditions.

The primary object of this invention is therefore to provide an improved non-thermoplastic sheet material which can be manufactured from a plastic composition by calendering and subsequently baking to render the plastic composition non-thermoplastic and insoluble.

Other objects will appear as the description of the invention proceeds.

These objects are accomplished by preparing sheet material by a process which comprises calendering a mixture containing a monohydric alcohol-modified urea-formaldehyde resin and a hydroxy-containing polymeric material having a hydroxyl number less than about 275 at a temperature not exceeding about 100° C. and then heating the resulting sheet material at a temperature above 100° C., preferably above 110° C., for a time sufficient to insolubilize the hydroxylated polymeric material.

In the drawing the single figure represents a flow sheet in which the hydroxyl containing polymer, e. g., polyvinyl butyral, plasticizer, and alcohol modified urea-formaldehyde resin are charged into a mill at 60° C. to 70° C., until the mass is homogeneous after which it is delivered to a calender which deposits a film of the composition onto a fabric. The calender is maintained below 100° C. The coated fabric is then passed through a curing chamber and is cured above 100° C., preferably above 110° C., after which it is allowed to cool and may be wound up on a roll for storage or shipment.

It has been found that compositions comprising a thermoplastic polymeric material having a hydroxyl number between 60 and 275 and a smaller amount of an alcohol-modified urea-formaldehyde resin do not cure during milling or calendering at temperatures below about 100° C. but become insoluble and non-thermoplastic when the calendered article is heated for 2 hours at about 120° C. The polymeric material containing the hydroxyl groups more preferably should have a hydroxyl number between 100 and 170 and may be an acetal of polyvinyl alcohol containing the required number of free hydroxyl groups, a partially hydrolyzed polyvinyl acetate or a hydrolyzed interpolymer of vinyl acetate.

Hydroxyl number is defined as the number of milligrams of potassium hydroxide required to saponify the ester groups produced by completely esterifying one gram of the polymeric material.

The alcohol-modified urea-formaldehyde resins which are suitable are those which may be prepared from urea, formaldehyde and a monohydric alcohol, e. g. by the method of Edgar and Robinson described in U. S. Patent 2,191,957. Ordinary urea-formaldehyde resins which are prepared in aqueous media and dimethylolurea also cause the hydroxyl-containing polymers to become insoluble and non-thermoplastic but are not suitable for use in this invention because they cause curing to occur prematurely during processing. The alcohol-modified urea-formaldehyde resins used in this invention are in certain respects superior to the dialkyl ethers of dimethylolurea as curing agents since they show less tendency to cause premature curing during processing. Furthermore, due probably to their higher molecular weight, they do not migrate to the surface of the film as is sometimes the case with the dialkyl ethers of dimethylolurea.

The invention is illustrated by the following examples. All parts are by weight.

*Example I*

The following materials are mixed together in a Banbury mixer:

| | Parts |
|---|---|
| Polyvinyl butyral (hydroxyl number 162) | 100 |
| Di(butoxyethyl) sebacate | 40 |
| Dibutylammonium oleate | 4 |
| Hydrogenated castor oil | 5 |
| 60% solution of butanol-modified urea-formaldehyde resin in n-butanol | 6.9 |
| Ethyl alcohol | 200 |

When well mixed the sticky mass is transferred to warm rubber rolls and milled until free of solvent. The plastic composition is calendered into unsupported sheeting between rolls heated to 60–70° C. The smooth, soluble, thermoplastic film obtained in this way is baked for 2½ hours at 120° C. The baked film is insoluble in acetone, unaffected by boiling water and in the cold crack test, in which a piece of film is doubled under a standard impact, does not fail at temperatures above −40° C.

The rate of curing of a calender coating composition at a temperature somewhat above the intended calendering temperature is a measure of the freedom of the composition from tendencies toward premature curing. The composition of Example I does not become insoluble in acetone upon heating at 100° C. for 2½ hours. In contrast, another composition containing an equal weight (on a solids basis) of dimethylolurea instead of the butanol-modified urea-formaldehyde resin was insoluble after heating for only 10 minutes at 100° C.

The butanol-modified urea-formaldehyde resin used in Example I is prepared in the following manner: 747 parts 37.1% aqueous formaldehyde solution is adjusted to pH 8.6 and placed with 700 parts butanol and 252 parts urea in a reactor of the type described by Edgar and Robinson in U. S. Patent 2,191,957. The reaction mixture is heated to the boiling point and maintained at this temperature for one hour without removing any water. A solution of 10 parts of phthalic anhydride in 50 parts of butanol and 100 parts of toluene is added slowly to the reaction mixture. Heating is continued. Water is separated from the distillate and the butanol returned to the reaction mixture until the temperature of the boiling reaction mixture reaches 97° C. The product is then concentrated by distillation until it contains 60% solids.

*Example II*

A coating composition is prepared from the following materials as described below:

| | Parts |
|---|---|
| Polyvinyl butyral (hydroxyl number 144) | 100 |
| Di(butoxyethyl) sebacate | 40 |
| Dibutylammonium oleate | 5 |
| 70% solution of butanol-modified urea-formaldehyde resin in n-butanol | 21.5 |
| Ethyl alcohol | 100 |
| Whiting | 75 |
| Carbon black | 5 |

The materials, with the exception of the whiting and carbon black, are mixed together with a paddle and allowed to stand overnight in a closed container. The mixture is transferred to a warm rubber mill and milled until free of solvent. The whiting and carbon black are then added on the mill and milling is continued until the pigments are uniformly dispersed. The material is calendered into unsupported sheeting between rolls heated at 60–70° C. The sheeting is supported on Holland cloth and cured in an oven for 2 hours at 125° C. The cured sheeting is insoluble in acetone, ethyl alcohol, and ethyl acetate, which are solvents for untreated polyvinyl butyral. Curing also improves the recovery from elongation and eliminates the tackiness of the sheeting.

The freedom of this composition from tendencies to cure during processing is shown by the fact that it remains soluble in acetone when heated for 2½ hours at 100° C. In contrast, another composition in which an equivalent weight (on a solids basis) of an unmodified urea-formaldehyde resin is substituted for the butanol-modified urea-formaldehyde resin becomes insoluble in acetone within 10 minutes heating at 100° C.

The butanol-modified urea-formaldehyde resin used in Example II is prepared in the same manner as that of Example I except that the amount of formaldehyde is increased by 25% and water is removed and distillate returned to the reaction mixture until the reaction mixture reaches a temperature of 115° C. The resin solution is then concentrated by distillation until it contains 70% of solids.

*Example III*

A coating composition containing the following ingredients is prepared as described below:

| | Parts |
|---|---|
| Polyvinyl butyral (hydroxyl number 144) | 100 |
| Di(butoxyethyl) sebacate | 40 |
| Dibutylammonium oleate | 5 |
| 60% solution of butanol-modified urea-formaldehyde resin in n-butanol (prepared as described in Example I) | 44 |
| Ethyl alcohol | 100 |
| Whiting | 75 |
| Carbon black | 1 |

The materials, with the exception of the pigments, are mixed together with a paddle and allowed to stand overnight in a closed container. The mixture is transferred to a warm rubber mill and milled until free of solvent. The whiting and carbon black are then added on the mill and milling is continued until the pigments are uniformly dispersed. The composition is transferred to a calender mill with rolls heated at about 70° C. and calendered onto fabric which has been anchor coated as described below. The coating is then cured by baking in an oven for 2.5 hours at 125° C. The cured coating has a smooth, dry surface and is insoluble in solvents such as acetone and ethyl alcohol. When the coated fabric is folded, coated surface against coated surface, and heated on a metal block at 200° C. no sticking of the coating occurs. This product does not fail above —5° C. in the cold crack test and withstands 1,000,000 flexes before failure in the Schiltknecht flex test described in Bulletin #5 of Alfred Suter, 200 Fifth Avenue, New York.

Another sample of coated fabric is prepared in the same manner except that the baking treatment is omitted. The coating of this sample is soluble in acetone or ethyl alcohol. When a folded sample of this coated fabric is heated on a metal block at 200 C. the coated surfaces fuse together so completely that they cannot be pulled apart without severe injury to the coated fabric.

The anchor coated fabric used above is prepared by coating cotton sheeting with a solution containing 2 parts of polyvinyl butyral and 3 parts of hydrogenated methyl abietate in 2 parts of ethyl acetate. One coat of the solution is applied by means of a doctor knife.

*Example IV*

A master batch was prepared from the following materials as is described below:

| | Parts |
|---|---|
| Polyvinyl butyral (hydroxyl number 144) | 100 |
| Di(butoxyethyl) sebacate | 40 |
| Dibutylammonium oleate | 5 |
| Ethyl alcohol | 100 |
| Whiting | 75 |
| Carbon black | 5 |

The materials, with the exception of whiting and carbon black, are mixed together and allowed to stand overnight. The mixture is transferred to a warm rubber mill and milled until the solvent has evaporated. The whiting and carbon black are then milled into the composition and milling is continued until the pigments are uniformly dispersed.

To 22.5 parts of the above master batch is added 1.6 parts of a 60% solution of methanol-modified urea-formaldehyde resin in methanol and the materials are milled until the modified urea-formaldehyde resin is uniformly dispersed and the solvent is evaporated. A test on a portion of this composition shows that it does not become insoluble in acetone when it is heated at 100° C. for 2½ hours. The remainder of the composition is calendered into unsupported sheeting between rolls heated at 60 to 70° C. and then cured in an oven for 2 hours at 125° C. The resultant sheeting is insoluble in acetone, has improved recovery from stretch, and is substantially non-thermoplastic. A portion of the master batch to which none of the modified urea-formaldehyde resin has been added is still soluble and thermoplastic after baking for 2 hours at 125° C.

The methanol-modified urea-formaldehyde resin is prepared as follows: 747 parts of 37% aqueous formaldehyde solution is adjusted to a pH of 8.7 by addition of 10% sodium hydroxide solution. To this solution is added 252 parts urea and 700 of methanol and the mixture is heated under reflux for 30 minutes. A solution of 10 parts phthalic anhydride (catalyst) dissolved in 100 parts methanol is then added. The condenser is set downward for distillation and methanol is distilled from the reaction mixture while maintaining the volume of the reactants constant by addition of more methanol. The distillate is tested for the presence of water by occasionally diluting a few drops with benzene. Distillation is continued until the distillate is entirely miscible with benzene. The reaction mixture is then filtered to remove a small amount of insoluble condensation product and the filtrate is concentrated by a distillation until it contains 60% solids.

The advantage of the methanol-modified urea-formaldehyde resin over the corresponding ether of monomeric dimethylol-urea is shown by an experiment in which 0.96 part of the monomeric dimethyl ether of dimethylolurea (equivalent on a solids basis to 1.6 parts of 60% solution of methanol-modified urea-formaldehyde resin) is milled into 22.5 parts of the master batch used in Example IV. This composition becomes insoluble in acetone when heated for 10 minutes at 100° C. Furthermore, when the calendered film is allowed to stand for several days before curing, the dimethyl ether of dimethylolurea separates out on the surface of the composition and can be rubbed off. The methanol-modified urea-formaldehyde resin does not show any tendency to separate from the composition.

*Example V*

A solution is prepared by mixing together the following materials with suitable agitation.

| | Parts |
|---|---|
| Polyvinyl butyral (hydroxyl number 144) | 100 |
| Dicapryl phthalate | 100 |
| 60% solution of butanol-modified urea-formaldehyde resin | 28 |
| Denatured ethyl alcohol | 250 |

A dyed cotton sheeting weighing approximately 4 oz. per sq. yd. is anchor-coated with this solution by spreading with a doctor knife. A film weighing about 1 oz. per sq. yd., after evaporation of the solvent, is applied in this way.

A composition for calendering upon the above prepared anchor-coated fabric is compounded from the following materials:

| | Parts |
|---|---|
| Polyvinyl butyral (hydroxyl number 144) | 40 |
| Dicapryl phthalate | 30 |
| Dibutylammonium oleate | 2 |
| 60% solution of butanol-modified urea-formaldehyde resin in n-butanol | 11 |
| Clay | 30 |
| Colored pigment | 1 |

The polyvinyl butyral, dicapryl phthalate and dibutylammonium oleate are intimately mixed by compounding for 20 minutes at room temperature in a Werner and Pfleiderer mixer. The mass is then colloided by passage through an internal screw mixer, such as a Royle strainer, and sheeted on a rubber mill as a master batch. The calender coating composition is prepared as needed by adding the butanol-modified urea-formaldehyde resin, clay and pigment to the plasticized polyvinyl butyral master batch while milling on a rubber mill.

A coating weighing approximately 3 oz. per sq. yd. of this composition is applied to the anchor-coated fabric by means of a four-roll calender mill. The upper two rolls of the calender are preferably heated at 74° C., while the third or face roll is heated at 77° C. The temperature of the bottom roll is not critical but is usually maintained between room temperature and 43° C. As the coated fabric leaves the calender mill it is dusted with a mixture consisting of 75 parts of talc and 25 parts cornstarch.

Raincoats are manufactured from this coated fabric by the conventional method for preparing fully cemented, cured coats. The pieces are cut to pattern, assembled and cemented with an alcohol solution of the following materials:

| | Parts |
|---|---|
| Polyvinyl butyral (hydroxyl number 144) | 40 |
| Dicapryl phthalate | 30 |
| Dibutyl phthalate | 20 |
| Dibutylammonium oleate | 2 |
| 60% solution of butanol-modified urea-formaldehyde resin in n-butanol | 11 |
| Clay | 30 |
| Colored pigment | 1 |

Following assembly and cementing the coats are cured for one hour at 127° C. to render the coating and seams insoluble and non-thermoplastic.

The butanol-modified urea-formaldehyde resin used throughout Example V is prepared by the method described in Example I.

*Example VI*

A calenderable composition is prepared from the following materials as described below:

| | Parts |
|---|---|
| Polyvinyl butyral (hydroxyl number 253) | 100 |
| Di(butoxyethyl) sebacate | 40 |
| Dibutylammonium oleate | 5 |
| 60% solution of butanol-modified urea-formaldehyde resin in normal butanol (preparation described in Example I) | 25 |
| Ethyl alcohol | 100 |
| Whiting | 75 |
| Carbon black | 1 |

The materials, with the exception of the whiting and carbon black, are mixed together with the paddle and allowed to stand overnight in a closed container. The materials are then mixed on a warm rubber mill until substantially all of the solvent has been volatilized and then the pigments are mixed in by milling. The composition is calendered into unsupported sheeting between rolls heated at 70–80° C. and the sheeting is then cured 1½ hours at 120° C. The product is insoluble in acetone and alcohol, is non-thermoplastic and has a dry hard surface. It is somewhat less pliable than a similar product prepared from polyvinyl butyral, having a hydroxyl number of 144.

Another composition was prepared in which polyvinyl butyral having a hydroxyl number of 359 was substituted for the polyvinyl butyral of Example VI. This composition cured so rapidly during milling that it crumbled and fell from the rolls before all the pigment could be added. It is, therefore, not suitable for use as a calendering composition.

Example VII

A coating composition containing the following ingredients is prepared as described below:

| | Parts |
|---|---|
| Polyvinyl ketal of methyl ethyl ketone (hydroxyl number 242) | 100 |
| Dibutyl sebacate | 43 |
| Di(butoxyethyl) sebacate | 43 |
| 60% solution of butanol-modified urea-formaldehyde resin in n-butanol (prepared as in Example I) | 25 |
| Dibutylammonium oleate | 7 |
| Ethyl alcohol | 200 |
| Crown clay | 54 |
| Carbon black | 3.5 |

The materials with the exception of the pigments are mixed together with a paddle and allowed to stand overnight in a closed container. The mixture is then transferred to a warm rubber mill and milled until free of alcohol. The Crown clay and carbon black are then added and milling is continued until the pigments are uniformly dispersed. The composition is then transferred to a calender mill with rolls heated at 50 to 55° C. A film 0.005" in thickness is applied by calendering upon a thin cotton sheeting which has previously been coated with the polyvinyl butyral anchor coat described in the first paragraph of Example V. After curing at 120° C. for two hours the coating is insoluble in ethyl alcohol, is unaffected by boiling water, and does not become soft or sticky at 200° C. In the cold crack test it does not crack at −15° C. This coated fabric is suitable for use in the preparation of raincoats. In contrast the coating of another sample prepared in the same way but omitting the baking treatment dissolves rapidly in ethyl alcohol, and becomes soft and sticky in boiling water.

The polyvinyl ketal used in Example VII was prepared as described in Agre, Dorough and Hanford, Serial No. 274,804, now Patent 2,341,306.

Example VIII

A coating composition containing the following ingredients is prepared as described below:

| | Parts |
|---|---|
| Acetal of a partially hydrolyzed polyvinyl acetate | 100 |
| Di(butoxyethyl) sebacate | 50 |
| 60% solution of butanol-modified urea-formaldehyde resin in butanol (prepared as in Example I) | 25 |
| Dibutylammonium oleate | 5 |
| Ethyl alcohol | 100 |
| Crown clay | 50 |
| Carbon black | 5 |

The materials with the exception of the pigments are mixed together with a paddle and allowed to stand overnight in a closed container. The mixture is then transferred to a warm rubber mill and milled until free of alcohol. The Crown clay and carbon black are then added and milling is continued until the pigments are uniformly dispersed. The composition is then transferred to a calender mill with rolls heated at 40 to 45° C. A film 0.005" in thickness is applied by calendering upon a thin cotton sheeting which has previously been coated with the polyvinyl butyral anchor coat described in the first paragraph of Example V. After curing at 120° C. for two hours the coating is insoluble in ethyl alcohol, is unaffected by boiling water, and does not become soft or sticky at 200° C. In the cold crack test it does not crack at −15° C. This coated fabric is suitable for use in the preparation of raincoats. In contrast the coating of another sample prepared in the same way but omitting the baking treatment dissolves rapidly in ethyl alcohol, and becomes soft and sticky in boiling water.

The polyvinyl acetal used in Example VIII was prepared from acetaldehyde and hydrolyzed polyvinyl acetate. It has a hydroxyl number of 86 (corresponding to 6.8% hydroxyl calculated as vinyl alcohol) and an acetoxy content of 36.3% calculated as vinyl acetate.

As hydroxylated polymers which are suitable for use in this invention may be mentioned partially hydrolyzed polyvinyl acetate and acetals which can be prepared from polyvinyl alcohol and aldehydes or ketones, such as formaldehyde, acetaldehyde, butyraldehyde, acetone, and methyl ethyl ketone and which have a hydroxyl content of 4.7 to 21.6% calculated as polyvinyl alcohol (corresponding to a hydroxyl number of 60 to 275). The polyvinyl acetals may contain inactive groups, such as acetoxy groups, in addition to the hydroxyl groups. Although the alcohol-modified urea-formaldehyde resins of this invention are superior to known cross-linking agents when used with all types of polyvinyl acetals, I find that the greatest margin of safety against premature curing during forming operations is obtained when polyvinyl acetals having low concentrations of hydroxyl groups are used. I therefore prefer to use polyvinyl acetals having a hydroxyl number between 110 and 260 and particularly prefer the polyvinyl acetals having a hydroxyl number of 120 to 165. Although the preferred polyvinyl acetals have lower hydroxyl numbers the invention is of great value for calendering polyvinyl acetals having hydroxyl numbers of about 250. Since the rate of curing increases with increasing hydroxyl content, only the mildest curing agents such as the alcohol-modified urea-formaldehyde resins can be used with these resins without encountering premature curing.

Other suitable hydroxyl-containing polymeric materials include hydrolyzed vinyl organic ester interpolymers, such as are obtained, for example, by hydrolyzing interpolymers of vinyl acetate and ethylene. The preferred hydroxyl-containing polymeric materials are those having a linear structure, i. e. two-dimensional polymers.

The alcohol-modified urea-formaldehyde resins used in this invention are those prepared according to the method of Edgar and Robinson described in U. S. Patent 2,191,957. The ratio of urea, formaldehyde and combined alcohol can be varied from 1:1.5:0.5 to 1:3:2. The monohydric alcohols containing one to six carbon atoms are most suitable for use in the preparation of these modified urea-formaldehyde resins. Monohydric alcohol-modified thiourea-formaldehyde resins can be used in place of the corresponding urea-formaldehyde resins.

The amount of alcohol-modified urea-formaldehyde resin used depends upon the hydroxylated polymer used, the degree of curing desired, the margin of safety against premature curing required, and the temperature and time to be used for curing. Somewhat higher concentrations of curing agent are required if a plasticizer which contains hydroxyl groups is used since then the plasticizer will consume some of the curing agent. The amount of curing agent (on a solids basis) should be at least 1% of the weight of hydroxyl-containing polymeric materials and should not exceed the weight of the hydroxyl-containing polymeric material. Preferably, the amount of curing agent should be (on a solids basis) 3 to 40% of the weight of hydroxyl-containing polymeric material.

The plasticizers suitable for use in this invention are the ones which are commonly used with the hydroxylated polymers in the absence of the cross-linking agent. For example, plasticizers suitable for use with polyvinyl acetals and ketals and particularly with polyvinyl butyral include sebacates such as dibutyl sebacate, di(methoxyethyl) sebacate, and di(butoxyethyl) sebacate; phthalates such as di(methoxyethyl) phthalate, di(ethoxyethyl) phthalate and di(butoxyethyl) phthalate, methyl phthalyl methyl glycolate and butyl phthalyl butyl glycolate; other esters such as butoxyethyl stearate, triethylene glycol di(2-ethylbutyrate), hydrogenated methyl abietate; oils such as castor oil, blown castor oil, bodied castor oil, linseed oil, blown linseed oil, blown corn oil, and blown cottonseed oil; phosphates such as tricresyl phosphate, triphenyl phosphate, and tri(tertiarybutylphenyl) phosphate, and chlorinated hydrocarbons such as chlorinated diphenyl. Soft polymeric materials such as certain alkyd resins and factices are also suitable for use.

Materials suitable for use as pigments or fillers in the compositions of this invention include in addition to color pigments, whiting, ground mica, clay, lithopone, barytes, zinc oxide, magnesium carbonate, magnesia, titanium oxide, carbon black, graphite, ground leather and ground cellulosic materials. Certain pigments such as Crown clay improve the scratch resistance of the cured compositions and also increase the rate of curing. Graphite and carbon black are superior to the other fillers listed for compositions which must be resistant to high temperature steam.

The methods of compounding the compositions may vary both with the polymer used and with the equipment available. It is sometimes desirable in preparing compositions for calendering to swell the polymer with a small amount of solvent in the presence of the plasticizer. Compounding and solvent removal can then be completed on a rubber mill or in an internal mixture of the Banbury or Werner and Pfleiderer type. For many purposes the preferred method of compounding is that illustrated in Example V in which the dry polymer is intimately mixed with a plasticizer in a Werner and Pfleiderer mixer and subsequently heated, either in the same or different type mixer to complete the colloiding action. Pigments and curing agent in this case may be added either during the initial mixing of polymer and plasticizer during the colloiding, or on a rubber mill after colloiding of the composition.

The compositions of this invention can be applied as coating compositions to fabric, paper, wood and metal by calendering at temperatures below 100° C., preferably between 40 and 90° C. They may also be calendered into unsupported sheeting. Although the properties of the compositions of this invention make them suitable for application by calendering, they are useful for other purposes as well. They may be extruded, molded or applied from solution as coating compositions.

The composition of this invention can be cured by heating in an oven, in a mold or press or by contact with a heated surface. Films or coated fabrics which are to be embossed may be cured in a press during the embossing treatment. In general satisfactory curing occurs when the product is baked in an oven for one to three hours at temperatures of 125 to 115° C. The longer time is required at the lower temperature. Higher temperatures up to 160 to 170° C. may be used with correspondingly shorter curing schedules. Certain of the compositions may be cured at temperatures as low as 105° C. if the length of time is sufficiently increased. In many cases it is advantageous to postpone curing of the composition until further fabrication processes are completed. For example, in Example V the coated fabric is not cured until after it has been fabricated into raincoats. Cements adhere better to the uncured composition. Furthermore, when curable cements are used, the coating and seams are all cured together by baking the final product. In a similar way it is possible to make heat sealed seams with uncured coated fabric which can then be cured by baking the final article.

The compositions of this invention can be used for the manufacture of coated fabrics or unsupported sheeting useful, for example, in preparing attractive soles and heels for shoes. Coated fabrics prepared from these compositions are suitable for use in the manufacture of raincoats, shower curtains, refrigerator bowl covers and bags, hot water bottles, hospital sheeting, baby carriage tops, baby bathinettes, upholstery, covers for footballs, basketballs, volley balls and other sporting goods; luggage, gaskets, dugout curtains, collapsible life boats and pontoons.

It is apparent that many widely different embodiments of this invention may be made without departing from the spirit and scope thereof, and therefore, it is not intended to be limited except as indicated in the appended claims.

I claim:

1. The process of preparing sheet material which comprises calendering a mixture containing a monohydric alcohol-modified urea-formaldehyde resin and a hydroxyl-containing polyvinyl acetal having a hydroxyl number between 60 and 275 at a temperature between 40 and 90° C., said mixture being substantially unreacted and solvent-free, and thereafter effecting reaction of the resin and hydroxyl-containing polymer by curing the calendered material at a temperature between 105 and 170° C.

2. The process of claim 1 in which the curing temperature is for 1 to 3 hours at a temperature between 115° C. and 125° C.

3. The process of claim 1 in which the polyvinyl acetal has a hydroxyl number between 110 and 260.

4. The process of claim 1 in which the polyvinyl acetal is a polyvinyl butyral.

5. The process of claim 1 in which the polyvinyl acetal is a polyvinyl butyral having a hydroxyl number between 120 and 165.

6. The process of claim 1 in which the ratio of polyvinyl acetal to the monohydric alcohol-modified urea-formaldehyde resin is approximately 4:1.

7. The process of claim 1 in which the monohydric alcohol-modified urea-formaldehyde resin is present in the amount of 3 to 40% of the polyvinyl acetal.

8. The process of manufacturing sheet material which comprises preparing a mixture of 100 parts of polyvinyl butyral having a hydroxyl number of about 145, a plasticizer, about 25 parts of a 60% solution of butanol modified urea-formaldehyde resin, and a solvent, milling the mass until it is substantially free of solvent at a temperature of about 60 to 70° C., calendering a sheet of the said mass, and thereafter curing the same by heating it for about 2 hours at about 120° C.

9. A calendered sheet material comprising the reaction product of a monohydric alcohol-modified urea-formaldehyde resin and a polyvinyl acetal having a hydroxyl number between 110 and 250.

10. The product of claim 9 in which the ratio of urea-formaldehyde resin to acetal is approximately 1 to 4.

11. The product of claim 9 in which the acetal is a polyvinyl butyral.

12. The product of claim 9 in which the acetal is a polyvinyl butyral having a hydroxyl number between 120 and 165.

ROBERT M. LEEKLEY.

REFERENCES CITED

The following references are of record in the file of this patent:

UNITED STATES PATENTS

| Number | Name | Date |
|---|---|---|
| 1,890,424 | Whitworth | Dec. 6, 1932 |
| 1,890,425 | Whitworth | Dec. 6, 1932 |
| 1,989,246 | Reed | Jan. 29, 1935 |
| 1,721,742 | Nash | July 23, 1929 |
| 2,277,480 | D'Alelio | Mar. 24, 1942 |
| 1,963,253 | Upper | June 19, 1934 |
| 2,301,959 | Lanning | Nov. 17, 1942 |
| 2,195,254 | Miller | Mar. 26, 1940 |
| 2,268,121 | Kingsley | Dec. 30, 1941 |
| 2,317,131 | Conaway | Apr. 20, 1943 |
| 1,242,592 | Redman et al. | Oct. 9, 1917 |
| 2,280,829 | Jebens | Apr. 28, 1942 |